(12) United States Patent
Jang et al.

(10) Patent No.: US 11,881,758 B2
(45) Date of Patent: Jan. 23, 2024

(54) DISPLAY DEVICE CONTROLLING THE SWITCHING DEVICE TO PERFORM MODULATION CONTROL OF OUTPUT VOLTAGE OF TRANSFORMER AND METHOD FOR CONTROLLING THE DISPLAY DEVICE

(71) Applicants: SAMSUNG ELECTRONICS CO., LTD., Suwon-si (KR); KOOKMIN UNIVERSITY INDUSTRY ACADEMIC COOPERATION FOUNDATION, Seoul (KR)

(72) Inventors: Du Hee Jang, Suwon-si (KR); Sang-Kyoo Han, Seoul (KR); Sang Hoon Lee, Suwon-si (KR); Ka San Ha, Suwon-si (KR)

(73) Assignees: SAMSUNG ELECTRONICS CO., LTD., Suwon-si (KR); KOOKMIN UNIVERSITY INDUSTRY ACADEMIC COOPERATION FOUNDATION, Seoul (KR)

(*) Notice: Subject to any disclaimer, the term of this patent is extended or adjusted under 35 U.S.C. 154(b) by 300 days.

(21) Appl. No.: 17/291,234

(22) PCT Filed: Nov. 6, 2019

(86) PCT No.: PCT/KR2019/014962
§ 371 (c)(1),
(2) Date: May 4, 2021

(87) PCT Pub. No.: WO2020/096341
PCT Pub. Date: May 14, 2020

(65) Prior Publication Data
US 2021/0407361 A1    Dec. 30, 2021

(30) Foreign Application Priority Data
Nov. 7, 2018 (KR) .......................... 10-2018-0135695

(51) Int. Cl.
*G09G 3/20* (2006.01)
*H02M 1/00* (2006.01)
(Continued)

(52) U.S. Cl.
CPC ............ *H02M 1/007* (2021.05); *G09G 1/005* (2013.01); *G09G 3/20* (2013.01); *H02M 1/0003* (2021.05);
(Continued)

(58) Field of Classification Search
None
See application file for complete search history.

(56) References Cited

U.S. PATENT DOCUMENTS 5,134,307 A * 7/1992 Nakano ................... H02J 9/062
363/126
3,027,174 A1 9/2011 Ryu et al.
(Continued)

FOREIGN PATENT DOCUMENTS

KR    10-1999-0069026    9/1999
KR    10-2004-0086285    10/2004
(Continued)

OTHER PUBLICATIONS

International Search Report for PCT/KR2019/014962 dated Mar. 18, 2020, 7 pages.
(Continued)

*Primary Examiner* — Amr A Awad
*Assistant Examiner* — Donna V Bocar
(74) *Attorney, Agent, or Firm* — Nixon & Vanderhye, P.C.

(57) ABSTRACT

The present disclosure provides a display device, which enables minimization of a transformer circuit and which can be driven using various commercial voltages, and a method for controlling the display device.
(Continued)

The display device according to an embodiment comprises: a display; a transformer which transforms commercial power and supplies the transformed commercial power to the display and which includes a plurality of switching devices; and a controller for determining, on the basis of the magnitude of an input voltage input to the transformer, whether or not to open at least one of the plurality of switching devices, and controlling the plurality of switching devices on the basis of an output voltage of the transformer to perform a modulation control of the output voltage to follow a predetermined reference voltage.

8 Claims, 17 Drawing Sheets

(51) Int. Cl.
| | |
|---|---|
| *H02M 7/219* | (2006.01) |
| *H02M 1/42* | (2007.01) |
| *H02M 3/00* | (2006.01) |
| *G09G 1/00* | (2006.01) |

(52) U.S. Cl.
CPC ....... *H02M 1/0043* (2021.05); *H02M 1/4225* (2013.01); *H02M 3/01* (2021.05); *H02M 7/219* (2013.01); *G09G 2330/02* (2013.01)

(56) References Cited

U.S. PATENT DOCUMENTS

| | | | |
|---|---|---|---|
| 9,948,204 B2 | 4/2018 | Fornage et al. | |
| 2004/0095119 A1 | 5/2004 | Kernahan et al. | |
| 2012/0294045 A1* | 11/2012 | Fornage | H02M 7/217 363/17 |
| 2013/0242629 A1* | 9/2013 | Kesterson | H02M 1/4225 363/84 |
| 2017/0038823 A1* | 2/2017 | Lee | G06F 1/3265 |

FOREIGN PATENT DOCUMENTS

| | | |
|---|---|---|
| KR | 10-2010-0011471 | 2/2010 |
| KR | 10-2011-0048309 | 5/2011 |
| KR | 10-2013-0076413 | 7/2013 |
| KR | 10-2014-0010421 | 1/2014 |
| KR | 10-2017-0017128 | 2/2017 |
| KR | 10-1905425 | 10/2018 |

OTHER PUBLICATIONS

Written Opinion of the ISA for PCT/KR2019/014962 dated Mar. 18, 2020, 6 pages.
Office Action dated Jan. 9, 2023 in Korean Patent Application No. 10-2018-0135695 and English-language machine translation.

* cited by examiner

DISPLAY DEVICE CONTROLLING THE SWITCHING DEVICE TO PERFORM MODULATION CONTROL OF OUTPUT VOLTAGE OF TRANSFORMER AND METHOD FOR CONTROLLING THE DISPLAY DEVICE

This application is the U.S. national phase of International Application No. PCT/KR2019/014962 filed Nov. 6, 2019 which designated the U.S. and claims priority to KR Patent Application No. 10-2018-0135695 filed Nov. 7, 2018, the entire contents of each of which are hereby incorporated by reference.

BACKGROUND

Field

The present disclosure relates to a display device and a method for controlling the same, and more particularly, to a display device configured to receive various ranges of voltages via a transformer circuit and a method for controlling the display device.

Description of Related Art

Display devices require a transformer circuit essentially including an insulating circuit and a power-factor improvement circuit configured to make an output current and an output voltage to be in the same phase.

In conventional display devices, a transformer circuit may receive an input of a commercial voltage and a power-factor improvement circuit may supply a power with an improved power factor to the display devices. In transformer circuits, a low-frequency transformer with 60 Hz has been used. Although such a transformer circuit may serve as an insulating circuit, it is difficult to reduce the size of the transformer, since the transformer circuit includes an electrolytic capacitor, and use commercial voltages with various magnitudes.

In addition, the power-factor improvement circuit may receive an input of a commercial voltage and transmit the voltage to the display device via a direct current (DC) converter, and in this case, a high-frequency transformer is used which makes minimization of the structure difficult due to a complex structure thereof.

Therefore, studies on display devices using a compact transformer circuit and various commercial voltages of various international standards have been required.

SUMMARY

The present disclosure is directed to providing a display device enabling minimization of a transformer circuit and driven using various commercial voltages and a method for controlling the display device.

One aspect of the present disclosure provides a display device including: a display; a transformer configured to transform a commercial power and supply the transformed commercial power to the display and including a plurality of switching devices; and a controller configured to determine whether or not to open at least one of a plurality of switching devices on the basis of a magnitude of an input voltage input to the transformer, and configured to control the plurality of switching devices on the basis of the output voltage of the transformer to perform a modulation control of the output voltage to follow a predetermined reference voltage.

The controller may control the transformer to operate as a half bridge LLC converter by opening the at least one switching device when the magnitude of the input voltage exceeds a predetermined value.

The controller may control the output voltage to follow the reference voltage by changing a modulation frequency of the plurality of switching devices on the basis of the output voltage.

The controller may control the output voltage to follow the reference voltage by changing a modulation width of the plurality of switching devices on the basis of the output voltage.

The controller may control the output voltage to follow the reference voltage by changing an operation phase of at least one of the plurality of switching devices on the basis of the output voltage.

The controller may determine a method for the modulation control on the basis of the magnitude of the input voltage.

The display device may further include a low pass filter connected to an output terminal of the transformer,
wherein the controller determines an average voltage of the low pass filter as the output voltage.

The display device may further include a peak detector connected to an output terminal of the transformer,
wherein the controller determines a peak value of the peak detector as the output voltage.

The plurality of switching devices may be classified into: a first switching part including at least one of the plurality of switching devices; and a second switching part including a plurality of switching devices not belonging to the first switching part,
wherein the controller controls the output voltage to follow the reference voltage by alternately turning on the first switching part and the second switching part.

The display device may further include a power-factor improver configured to increase an effective power of a power supply connected to the display device,
wherein the transformer circuit is configured to allow the power supply to supply a current to a predetermined region.

The controller may control the plurality of switching devices to control the output voltage to follow the reference voltage on the basis of a difference between the output voltage and the predetermined reference voltage.

Another aspect of the present disclosure provides a method of controlling a display device, the method including: determining whether or not to open at least one of a plurality of switching devices on the basis of a magnitude of an input voltage input to a transformer; and performing a modulation control of the output voltage to follow a predetermined reference voltage by controlling the plurality of switching devices on the basis of the output voltage of the transformer.

The determining whether or not to open the plurality of switching devices may include controlling the transformer to operate as a half bridge LLC converter by opening the at least one switching device when the magnitude of the input voltage exceeds a predetermined value.

The performing of the modulation control may include controlling the output voltage to follow the reference voltage by changing a modulation frequency of the plurality of switching devices on the basis of the output voltage.

The performing of the modulation control may include controlling the output voltage to follow the reference voltage by changing a modulation width of the plurality of switching devices based on the output voltage.

The performing of the modulation control may include controlling the output voltage to follow the reference voltage by changing an operation phase of at least one of the plurality of switching devices based on the output voltage.

The performing of the modulation control may include determining a method for the modulation control on the basis of the magnitude of the input voltage.

The performing of the modulation control may include determining an average voltage of a low pass filter connected to an outer terminal of the transformer as the output voltage.

The performing of the modulation control may include determining a peak value of a peak detector connected to an outer terminal of the transformer as the output voltage.

The performing of the modulation control may include controlling the output voltage to follow the reference voltage by alternately turning on and off a first switching part and a second switching part included in the plurality of switching devices.

The performing of the modulation control may include controlling the plurality of switching devices to control the output voltage to follow the reference voltage on the basis of a difference between the output voltage and the predetermined reference voltage.

According to the display device and the method for controlling the same according to the present disclosure, the transformer circuit may become smaller in size and operate using various commercial voltages.

DETAILED DESCRIPTION

Figure 1:
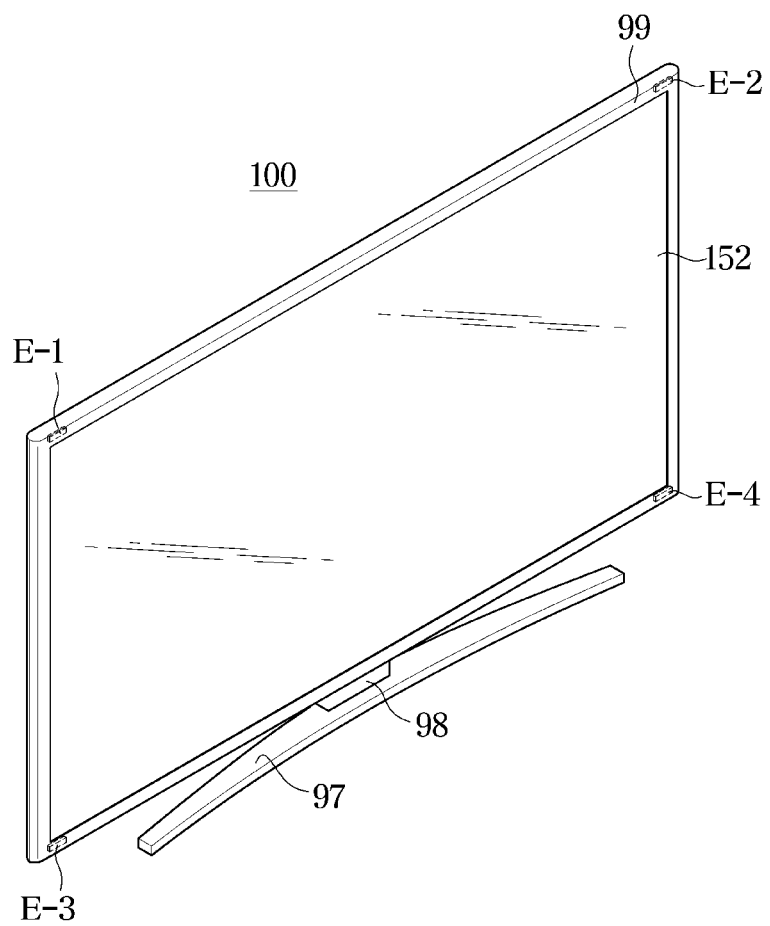
FIG. 1 is a diagram illustrating an external appearance of a display device according to an embodiment.

Reference will now be made in detail to the embodiments of the present disclosure, examples of which are illustrated in the accompanying drawings, wherein like reference numerals refer to like elements throughout. This specification does not describe all elements of the embodiments of the present disclosure and detailed descriptions on what are well known in the art or redundant descriptions on substantially the same configurations may be omitted. The terms 'unit', 'module', 'member', or 'block' used in the specification may be implemented using a software or hardware component. According to an embodiment, a plurality of 'units', 'modules', 'members', or blocks' may also be implemented using an element and one 'unit', 'module', 'member', or 'block' may include a plurality of elements.

Throughout the specification, when an element is referred to as being "connected to" another element, it may be directly or indirectly connected to the other element and the 'indirectly connected to' includes connected to the other element via a wireless communication network.

Also, it is to be understood that the terms "include" or "have" are intended to indicate the existence of elements disclosed in the specification, and are not intended to preclude the possibility that one or more other elements may exist or may be added.

Throughout the specification, it will be understood that when one element, is referred to as being "on" another element, it can be directly on the other element, or intervening elements may also be present therebetween.

The terms first, second etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, operating principles and embodiments of the present disclosure will be described with reference to the accompanying drawings.

FIG. 1 is a diagram illustrating an external appearance of a display device according to an embodiment.

Referring to FIG. 1, a display device 100, in appearance according to an embodiment, may include an external housing 99, a display panel 152, a support 98, and a leg 97.

The external housing 99 constitutes the exterior of the display device 100 and accommodates components installed therein and enabling the display device 100 to display various images or perform various functions. The external housing 99 may be formed integrally or may be formed of a combination of a plurality of housings, e.g., a front housing and a rear housing. In the external housing 99, an intermediate housing may further be installed.

The display panel 152 may be mounted on a front surface of the external housing 99 and display various images to the outside. Specifically, the display panel 152 may display at least one still image or moving image. The display panel 152 may be implemented by further using a separate component such as a touch panel, if required.

The support 98 connects the external housing 99 with the leg 97 while supporting the external housing 99. The support 98 may have various shapes according to designer's selection and may be omitted, if required. The support 98 may be attached to or detached from the external housing 99, if required. In addition, the display device 100 may include at least one antenna E-1 to E-4.

Figure 2:
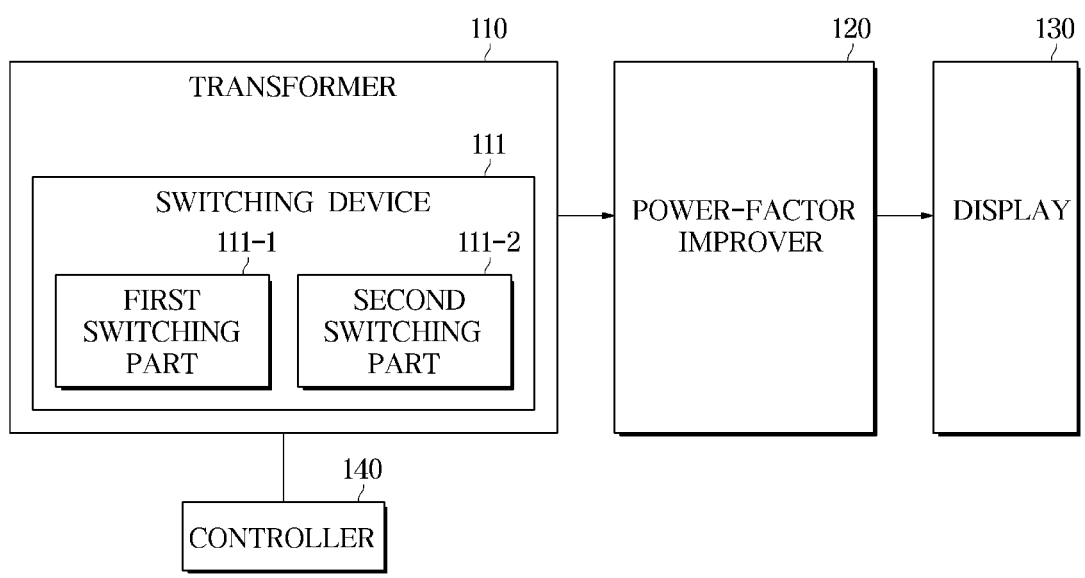
FIG. 2 is a control block diagram according to an embodiment.

FIG. 2 is a control block diagram of the display device 100 according to an embodiment.

Referring to FIG. 2, the display device 100 according to an embodiment may include a transformer 110, a controller 140, a power-factor improver 120, and a display 130.

The transformer 110 may transform and rectify a commercial powder and supply the transformed and rectified commercial power to the display 130 and may include a plurality of switching devices 111.

The transformer 110 may be implemented using a compact and lightweight adaptor enabling electrical insulation between a commercial power supply and a load and having a reduced size or weight compared to conventional methods. According to an embodiment, the commercial power supply may supply an AC voltage of 60 Hz to the transformer 110. According to an embodiment, the commercial power supply may supply an AC voltage of 90 to 264 Vrms. The transformer 110 according to an embodiment may be implemented as an LLC variable resonant converter. The transformer 110 may include at least one switching device 111, which will be described in more detail below.

The controller 140 may control On/Off of the plurality of switching devices 111 included in the transformer 110 on the basis of a magnitude of the input voltage input to the transformer 110. The controlling of the plurality of switching devices 111 performed by the controller 140 on the basis of the magnitude of the input voltage may include controlling the transformer 110 to operate as a half bridge converter by opening one of the plurality of switching devices 111.

The controller 140 may perform a modulation control of the output voltage by controlling On/Off of the plurality of the switching devices in the On state among the plurality of switching devices 111 on the basis of the output voltage of the transformer 110. As described above, the controller 140 may control at least one of the plurality of switching devices on the basis of the magnitude of the input voltage. Because a modulation control is not required for the switching device opened by the controller 140, the controller 140 may perform a modulation control of the output voltage by controlling the switching device of the transformer.

When the magnitude of the input voltage exceeds a predetermined value, the controller 140 may control the output voltage by setting at least one switching device in the Off state. Specifically, the predetermined value may be determined as 180 Vrms. In addition, when at least one switching device included in the transformer is in the Off state, the transformer may operate as a half bridge converter.

The controller 140 may control the output voltage by changing a modulation frequency of the plurality of switching devices 111 on the basis of the output voltage. Specifically, when the output voltage exceeds a predetermined reference voltage, the controller 140 may decrease the modulation frequency. When the output voltage is below the predetermined reference voltage, the controller 140 may increase the modulation frequency. The reference voltage may refer to a rated voltage supplied to the display device 100. Meanwhile, the operation of controlling the modulation frequency may be performed when the magnitude of the input voltage is equal to or greater than 90 Vrms and less than 132 Vrms and equal to or greater than 180 Vrms and equal to or less than 264 Vrms.

The controller 140 may control the output voltage by changing a modulation width of the plurality of switching devices 111 on the basis of the output voltage. Specifically, when the output voltage exceeds a predetermined reference voltage, the controller 140 may decrease the modulation width. When the output voltage is below the predetermined reference voltage, the controller 140 may increase the modulation width.

Meanwhile, the display device 100 may include a low pass filter connected to an output terminal of the transformer, and the controller may determine an average voltage of the low pass filter as the output voltage.

Also, the display device 100 may further include a peak detector connected to the output terminal of the transformer 110, and the controller may determine a peak value of the peak detector as the output voltage. Operation related to a circuit connected to the output terminal of the transformer 110 will be described below.

Meanwhile, the plurality of switching devices 111 may be divided into a first switching part 111-1 including at least one of the plurality of switching devices and a second switching part 111-2 including the other switching devices not belonging to the first switching part 111-1.

The controller 140 may control the output voltage by alternately turning on the first switching part 111-1 and the second switching part 111-2. That is, the plurality of switching devices 111 may be grouped into at least two groups, and the controller 140 may perform the above-described modulation control by alternately controlling each group of the switching devices 111.

The controller 140 may control the plurality of switching devices 111 such that the output voltage follows the reference voltage on the basis of a difference between the output voltage and the predetermined reference voltage.

The controller 140 may be implemented using a memory (not shown) that stores data about algorithms for controlling the operation of elements of the display device 100 or programs for realizing the algorithms and a processor (not shown) to perform the above-described operation using the data stored in the memory. In this regard, the memory and the processor may be implemented using separate chips. Alternatively, the memory and the processor may be integrated into a single chip.

In addition, the display device 100 may include the power-factor improver 120 configured to increase an effective power of a power supply connected to the display device 100. The power-factor improver will be described in more detail below.

At least one element may be added or deleted corresponding to performance of the elements of the display device 100 shown in FIG. 2. In addition, it will be readily understood by those skilled in the art that mural positions of the elements may be changed to correspond to performance or structure of a system.

Meanwhile, each of the elements shown in FIG. 2 may be a software and/or hardware component such as a Field Programmable Gate Array (FPGA) and an Application Specific Integrated Circuit (ASIC).

Figure 3:
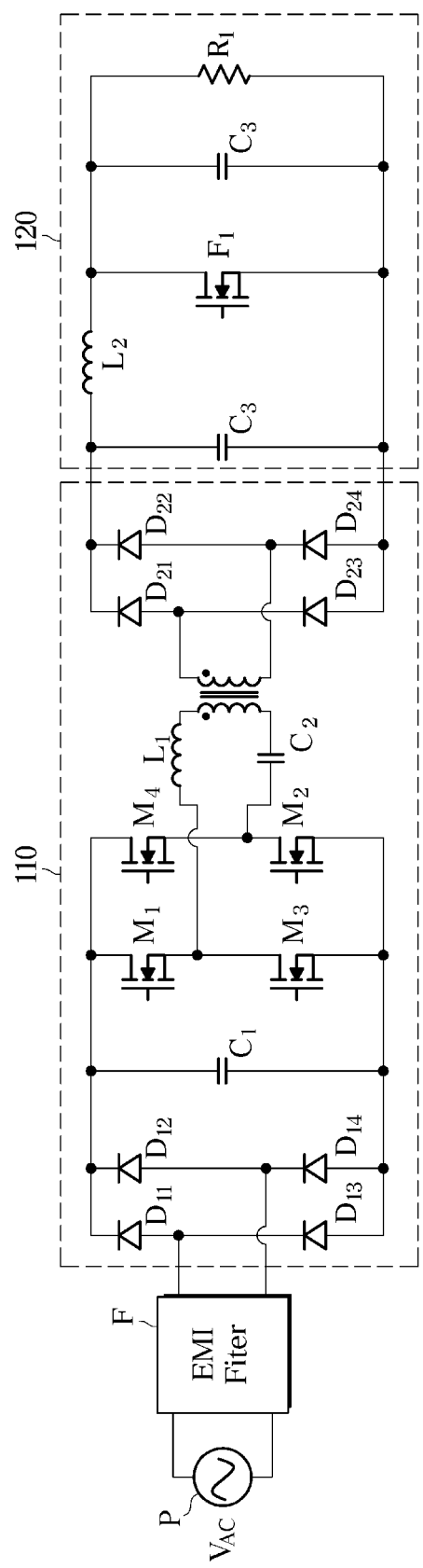
FIG. 3 is a diagram illustrating a transformer and a power-factor improver according to an embodiment.

FIG. 3 is a diagram illustrating a transformer and a power-factor improver according to an embodiment.

Referring to FIG. 3, the display device 100 may receive a power from a power supply P. The power supply P may supply a power via an electromagnetic interference filter F. The electromagnetic interference filter F may be provided to remove electromagnetic wave noise generated by current or voltage.

Meanwhile, the power supply to supply a power to the transformer 110 may be a commercial power supply. According to an embodiment, the commercial power supply may supply an AC voltage with a magnitude of 90 to 264 Vrms and a frequency of 60 Hz.

The transformer 110 may include at least one diode D12 to D14 to rectify the voltage received from the power supply. The transformer 110 does not include an electrolytic capacitor but may include a capacitor such as a film or ceramic with a small capacity. Without using the electrolytic capacitor, which has been conventionally used in the art, the transformer may become more lightweight and compact.

The transformer 110 may include a plurality of switching devices M1 to M4. According to an embodiment, the switching devices M1 to M4 may be formed of field effect transistors (FETs). A circuit may be open or shorted by the switching devices M1 to M4 based on the control by the controller 140 and a modulation control, which will be described below, may be performed thereby.

The transformer 110 may be implemented using an LLC variable resonant converter including an inductor L1 and a capacitor C2. The LLC variable resonant converter may be implemented as a circuit capable of controlling the output by changing a frequency of the switching device. The transformer 110 may include at least one diode D22 to D24 for rectification of the output voltage at the output terminal, and a voltage passing through the transformer 110 may be delivered to the display 130 via the power-factor improver 120.

The display 130 may be configured to output an image upon receiving a power. Specifically, the display 130 may be implemented using a cathode ray tube (CRT), a digital light processing (DLP) panel, a plasma display panel, a liquid crystal display (LCD) panel, an electro-luminescence (EL) panel, an electrophoretic display (EPD) panel, an electrochromic display (ECD) panel, a light emitting diode (LED) panel, an organic light emitting diode (OLED) panel, or the like, but is not limited thereto.

The power-factor improver 120 configured to make an output voltage of the transformer 110 and an output current corresponding thereto to be in the same phase includes an FET device, an inductor, a capacitor, a diode, and a resistance device in a circuit diagram of FIG. 3, but the configuration of the power-factor improver 120 is not particularly limited as long as the circuit is capable of improving the power factor.

Meanwhile, devices constituting the transformer 110 and the power-factor improver 120 described above in FIG. 3 are merely examples for describing the present disclosure and types of the devices are not particularly limited as long as the devices perform the operation of each element.

Figure 4A:
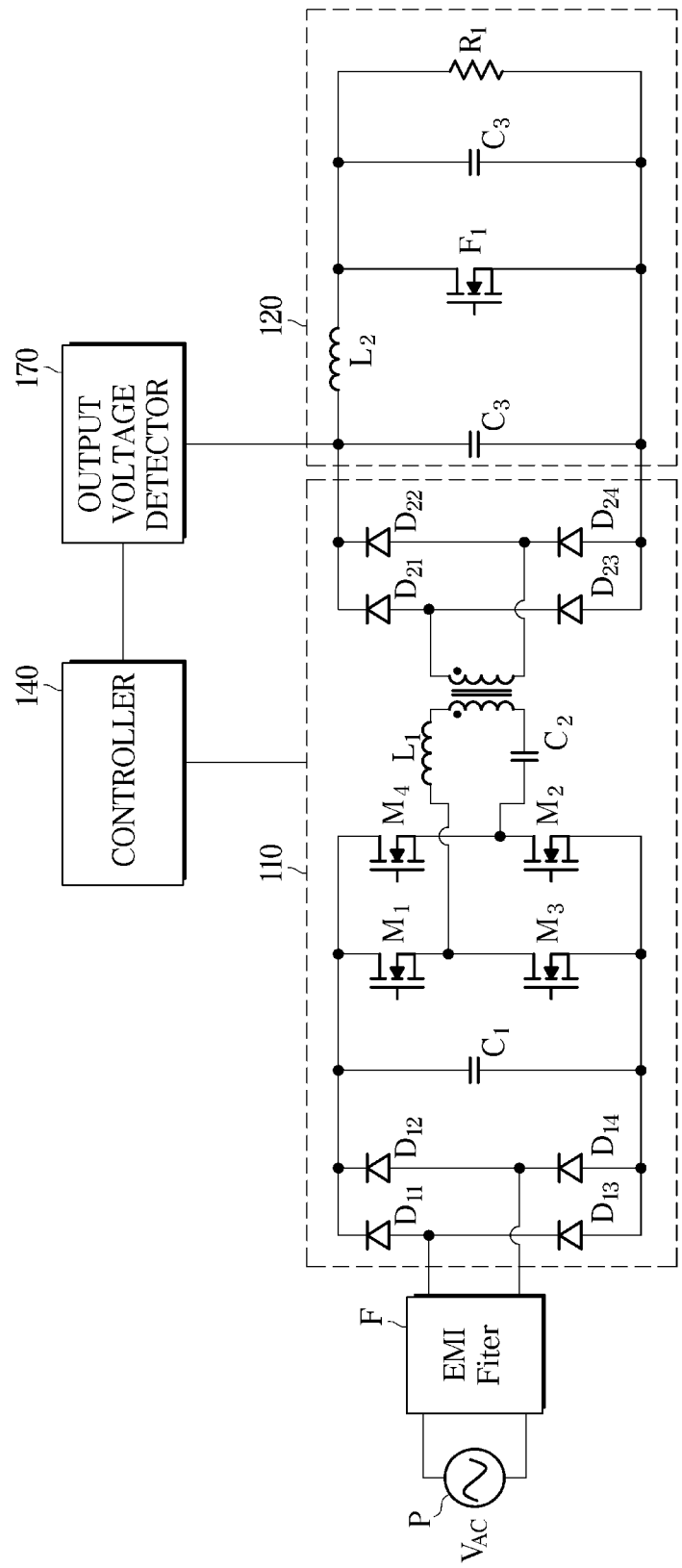
FIGS. 4A, 4B and 4C are diagrams illustrating an outer terminal of a transformer according to an embodiment.
Figure 4B:
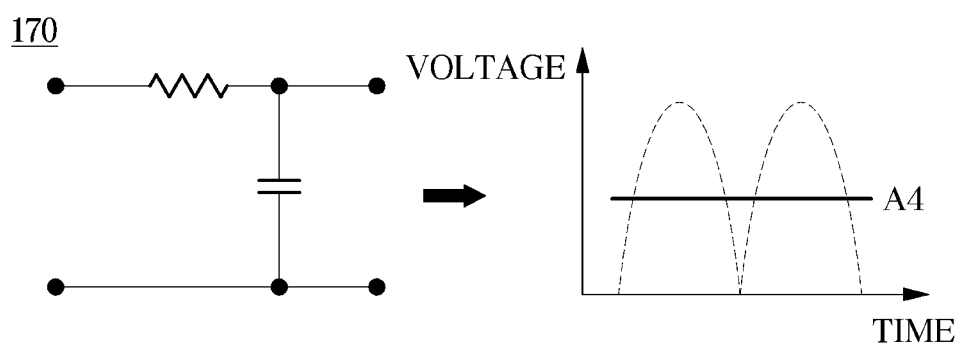
Figure 4C:
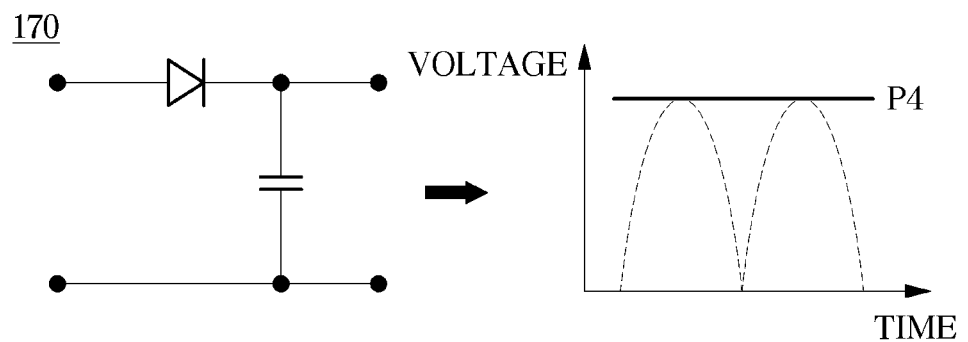

FIGS. 4A to 4C are diagrams illustrating an outer terminal of a transformer according to an embodiment.

Referring to FIG. 4A, FIG. 4A shows a configuration in which an output voltage detector 170 is further connected to the output terminal of the transformer 110 of FIG. 3. The output voltage detector 170 may be connected to the transformer 110 and transmit a voltage of the output terminal of the transformer 110 to the controller 140.

The controller 140 may receive the output voltage as an input from the output voltage detector 170 and control the plurality of switching devices on the basis of a difference between the output voltage and a predetermined reference voltage such that the output voltage follows the predetermined reference voltage. The control of the output voltage to follow the reference voltage may be performed by the controller 140 using a proportional control or an integral control. The proportional control refers to an operation of reducing a difference between the reference voltage and the output voltage by increasing the output of the controller proportionally to the difference, and the integral control refers to an operation of reducing the difference by generating outputs of the controller as much as accumulated errors.

The output voltage detector 170 may be configured with a low pass filter (LPF) as illustrated in FIG. 4B. In this case, the controller 140 may control the output voltage to follow the reference voltage based on an average voltage A4 of the output voltage detector 170. Meanwhile, the output voltage detector 170 may be configured with a peak detector as illustrated in FIG. 4C. In this case, the controller 140 may control the output voltage to follow the reference voltage based on a peak value P4 of the output voltage detector 170. In summary, the output voltage detector 170 may obtain a voltage of the output terminal of the transformer and transmits the voltage to the controller, and the controller may control the output voltage to follow the predetermined reference voltage based on the obtained output voltage. The operation related thereto will be described in detail below.

Meanwhile, the configuration and control operation of output voltage detector 170 described above with reference to FIGS. 4A to 4C are not particularly limited as long as the output voltage follows the reference voltage.

Figure 5:
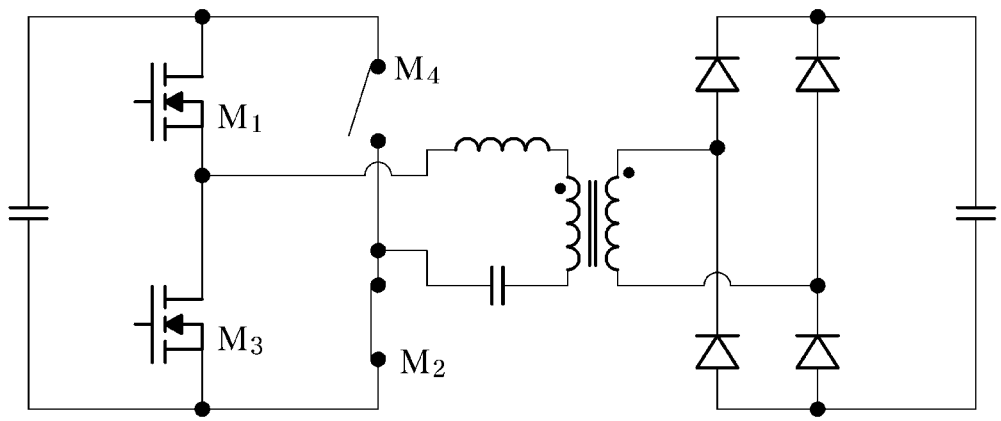
FIGS. 5 and 6 are diagrams for describing an operation of outputting an output voltage by opening at least one switching device.
Figure 6:
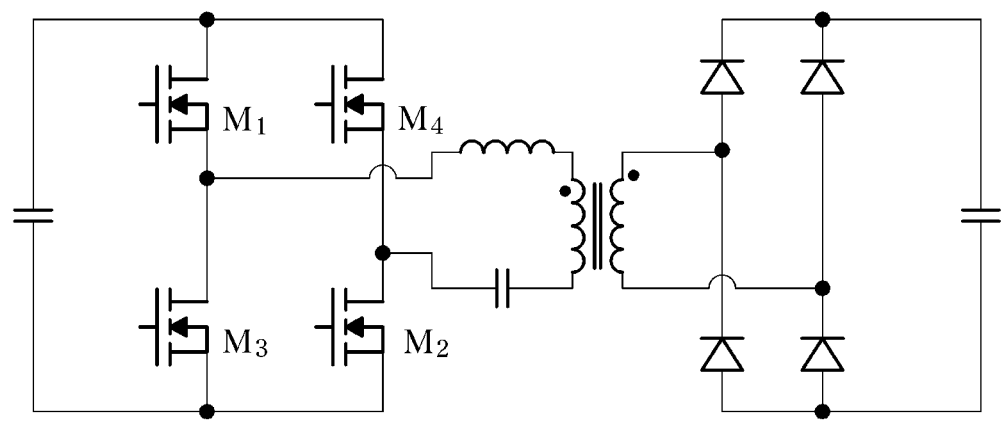

FIGS. 5 and 6 are diagrams for describing an operation of outputting an output voltage by opening at least one switching device.

Referring to FIG. 5, since the magnitude of the input voltage exceeds to the predetermined value, an operation of controlling at least one switching device in the Off state is illustrated.

When the input voltage exceeds a predetermined value, the controller maintains one of the switching devices (M2 in FIG. 5) in the On state and sets another switching device (M4 in FIG. 5) in the Off state, i.e., open, to transmit an input voltage substantially divided in half. According to an embodiment, the transformer of FIG. 5 may operate as a half bridge LLC converter.

For example, when the input voltage exceeds 180 Vrms and the display device is designed to receive about 100 Vrms, the input voltage exceeding 180 Vrms is higher than a rated voltage of the display device. Therefore, the controller may control the transformer to divide the input voltage by setting at least one M4 of the switching devices in the Off state.

That is, the controller 140 may operate as a voltage divider of the input voltage by opening some switching devices included in the transformer 110 and shorting the other switching devices. In FIG. 5, a circuit configured to transmit about a half of the input voltage to the output terminal of the transformer 110 is shown, but a ratio of the input voltage to the output voltage transmitted by controlling the switching devices performed by the controller 140 is not particularly limited.

The controller 140 may perform a modulation control, which will be described below, while controlling the other switching devices with a high-speed switching operation of repeating On/Off operations.

Meanwhile, referring to FIG. 6, an operation in the case where the magnitude of the input voltage is below the predetermined value is shown. When the input voltage is below the predetermined value (e.g., 180 Vrms), the controller 140 may transmit a voltage with a greater magnitude than that of the circuit shown in FIG. 5 by controlling On/Off of the switching devices M1 to M4 at a high speed as shown in FIG. 6 without opening or shorting some of the switching devices.

According to an embodiment, the circuit shown in FIG. 6 may operate as a full bridge LLC converter having an input/output voltage gain twice that of the half bridge LLC converter shown in FIG. 5.

Meanwhile, the changing of the magnitude of the input voltage by opening the switching device performed by the controller 140 is merely an example of the present disclosure, and types of the circuit configured to modify ratio and magnitude for changing an input voltage gain are not particularly limited.

Hereinafter, the plurality of switching devices corresponding to each drawing for describing the modulation control performed by the controller are referred to as first to fourth switching devices. The ordinal numbers applied to the switching devices are used for the purpose of description of the present disclosure and do not mean the priority between the operations of the switching devices.

Figure 7A:
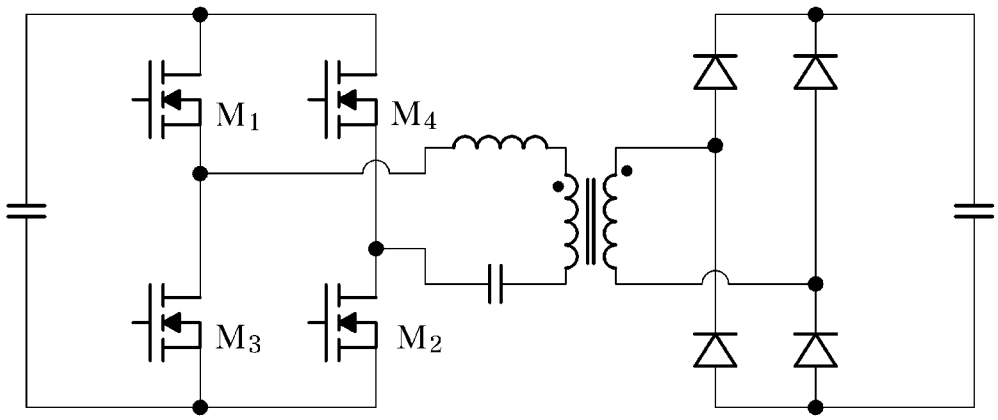
FIGS. 7A and 7B are diagrams for describing an operation of changing a modulation frequency according to an embodiment.
Figure 7B:
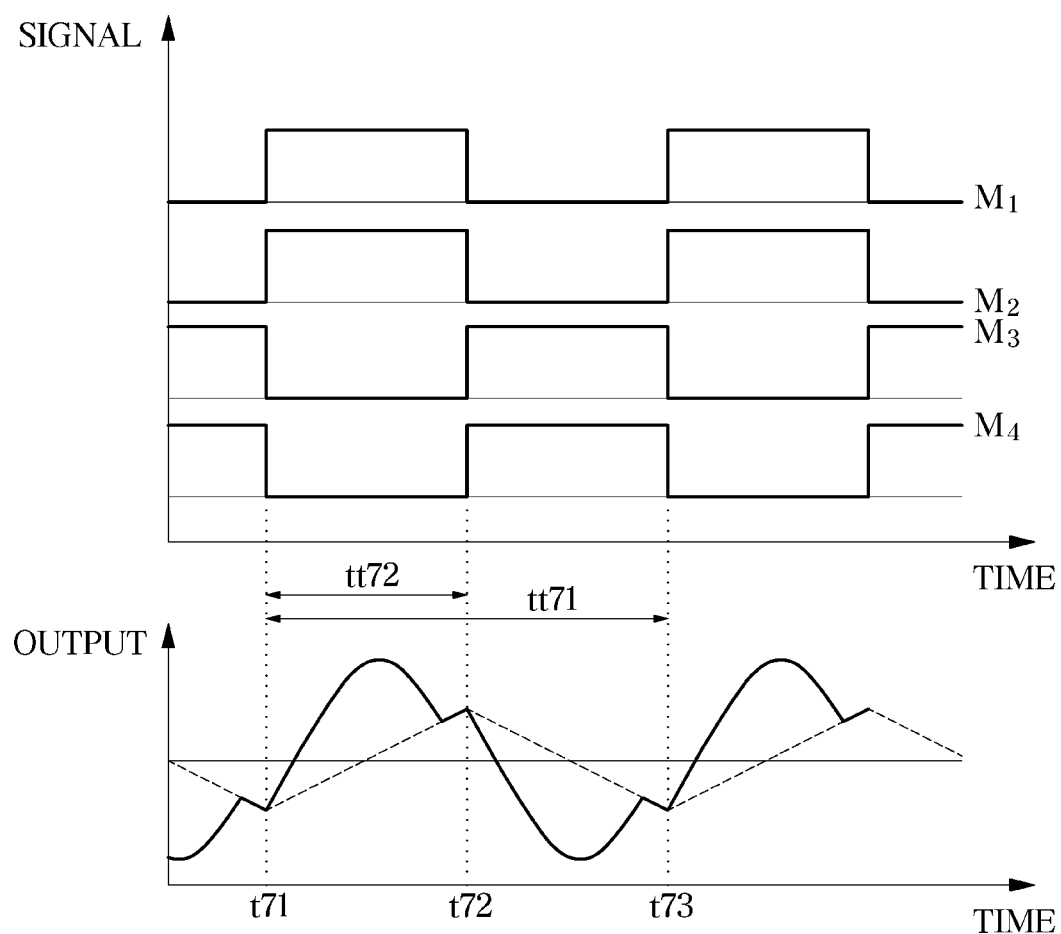

FIGS. 7A and 7B are diagrams for describing an operation of changing a modulation frequency according to an embodiment.

Referring to FIGS. 7A and 7B, the controller 140 performs a modulation control without opening or shorting one of the switching devices. The controller 140 may perform a modulation control of the input voltage by changing a modulation frequency while constantly maintaining a modulation width.

Specifically, referring to FIG. 7B, an operation period of the switching device controlled by the controller 140 may be determined as tt71. In the operation of changing the modulation frequency, the operation may be performed with a constantly fixed modulation width. The modulation width may be determined as a ratio of a period tt71 to an operation time tt72 of the switching device. According to an embodiment, the modulation width may have a duty cycle of 50%.

Meanwhile, the modulation frequency may be determined as an inverse number of the operation period tt71 of the first to fourth switching devices. As described above, the first to fourth switching devices may control the output voltage by changing the modulation frequency while constantly maintaining the modulation width.

Referring to FIG. 7B, an output current value between t1 and t2 may be derived in a section where the first and second switching devices are in the On state and an output current value between t2 and t3 may be derived in a section where the third and fourth switching devices are in the On state. Although a current flowing through the transformer is shown in FIG. 7B, a voltage is derived from the current, and thus a current waveform may be interpreted as a voltage waveform.

The controller 140 may control the output voltage to follow the reference voltage by comparing the magnitude of the output voltage derived by the above-described operation with that of the predetermined reference voltage.

For example, when the output voltage exceeds the reference voltage, the controller 140 may reduce the magnitude of the output voltage by decreasing the frequency of the switching devices. By decreasing the frequency, the magnitude of the modulated input voltage also decreases, and thus a voltage with a smaller magnitude may be output.

When the output voltage is below the reference voltage, the controller 140 may increase the magnitude of the output voltage by increasing the frequency of the switching devices. By increasing the frequency of the switching devices, the magnitude of the modulated input voltage also increases, and thus a voltage with a greater magnitude may be output. According to an embodiment, the operation as shown in FIGS. 7A and 7B may be performed when the magnitude of the input voltage is in the range of 90 Vrms to 132 Vrms.

Figure 8A:
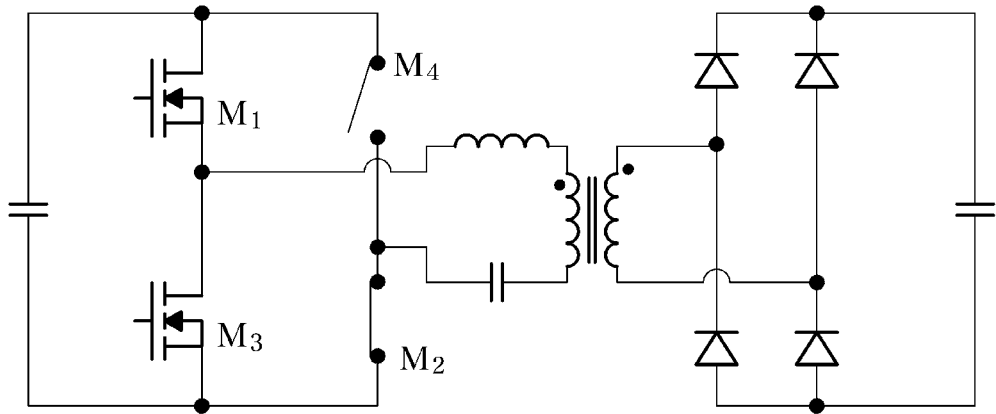
FIGS. 8A and 8B are diagrams for describing an operation of opening at least one switching device and changing a modulation frequency according to an embodiment.
Figure 8B:
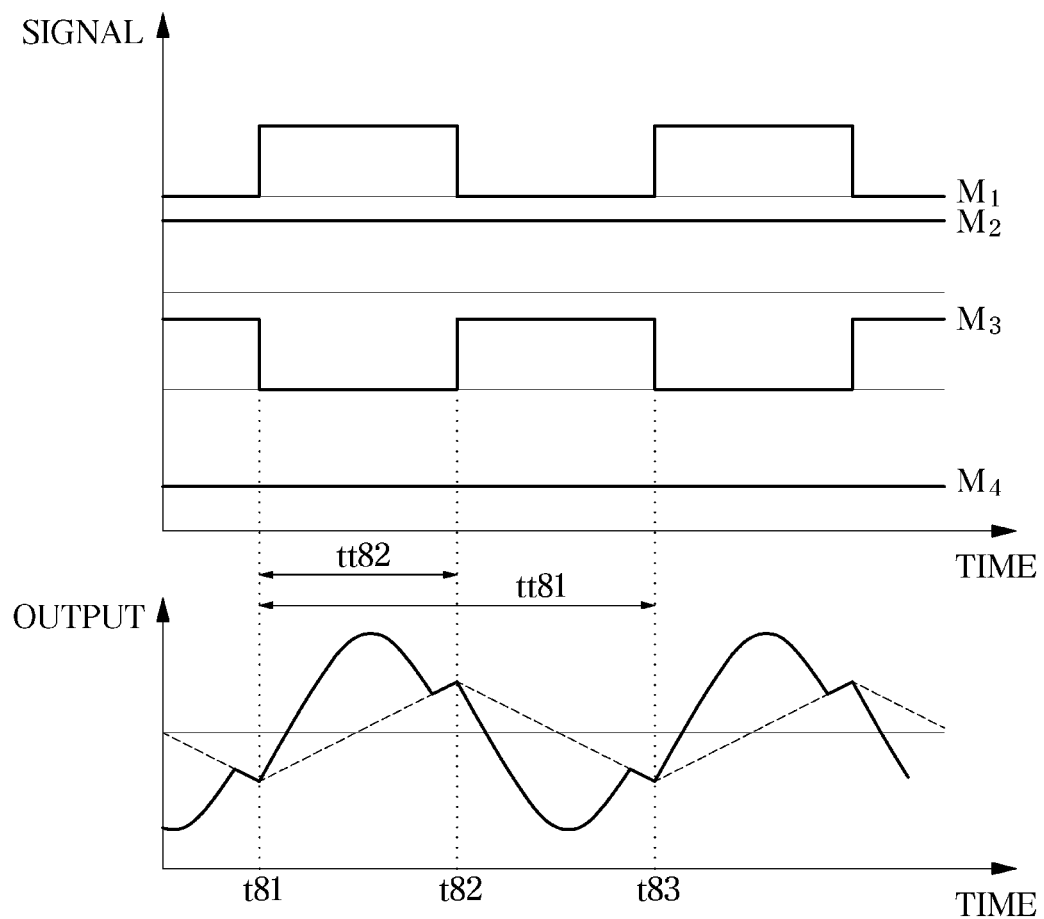

FIGS. 8A and 8B are diagrams for describing an operation of opening at least one switching device and changing a modulation frequency according to an embodiment.

Referring to FIGS. 8A and 8B, an operation, performed by the controller, of opening the circuit of the transformer all the times by maintaining the fourth switching device M4 in an Always-Off state and transmitting only a part of the input voltage by maintaining the second switching device M2 is in an Always-On state.

In this case, the controller 140 may perform a high-speed switching operation by controlling On/Off of the first switching device M1 and the third switching device M3.

Referring to FIG. 8B, an output current value between t81 and t82 may be derived in a section where the first switching device M1 is in the On state and an output current value between t82 and t83 may be derived in a section where the third switching device M3 is in the On state. Although a current flowing through the transformer is shown in FIG. 8B, the voltage is derived from the current, and thus a current waveform may be interpreted as a voltage waveform.

The controller 140 may control the output voltage to follow the reference voltage by comparing the magnitude of the output voltage derived from the above-described operation with that of the predetermined reference voltage.

For example, when the output voltage exceeds the reference voltage, the controller 140 may reduce the magnitude of the output voltage by decreasing the frequency of the switching devices M1 and M3. By decreasing the frequency, the magnitude of the modulated input voltage also decreases, and thus a voltage with a smaller magnitude may be output.

When the output voltage is below the reference voltage, the controller 140 may increase the magnitude of the output voltage by increasing the frequency of the switching devices M1 and M3. By increasing the frequency thereof, the magnitude of the modulated input voltage also increases, and thus a voltage with a greater magnitude may be output. According to an embodiment, the operation as shown in FIGS. 8A and 8B may be performed when the magnitude of the input voltage is in the range of 180 Vrms to 264 Vrms.

Figure 9A:
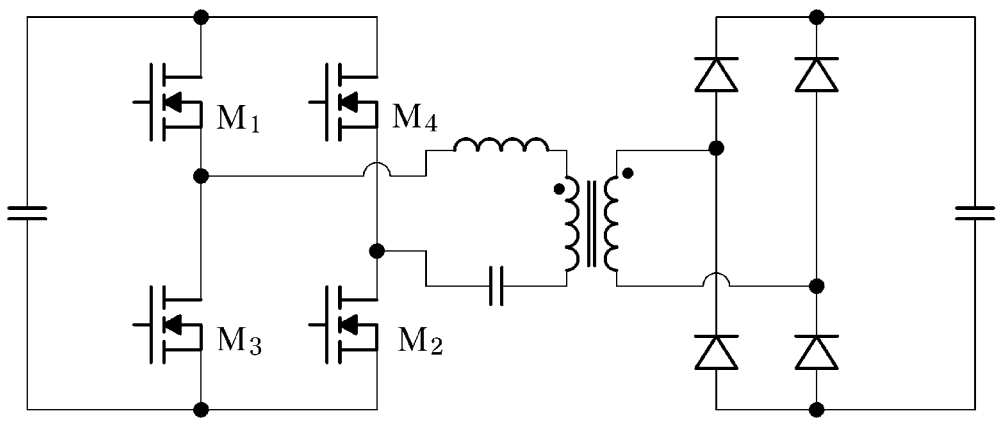
FIGS. 9A and 9B are diagrams for describing an operation of changing a modulation width according to an embodiment.
Figure 9B:
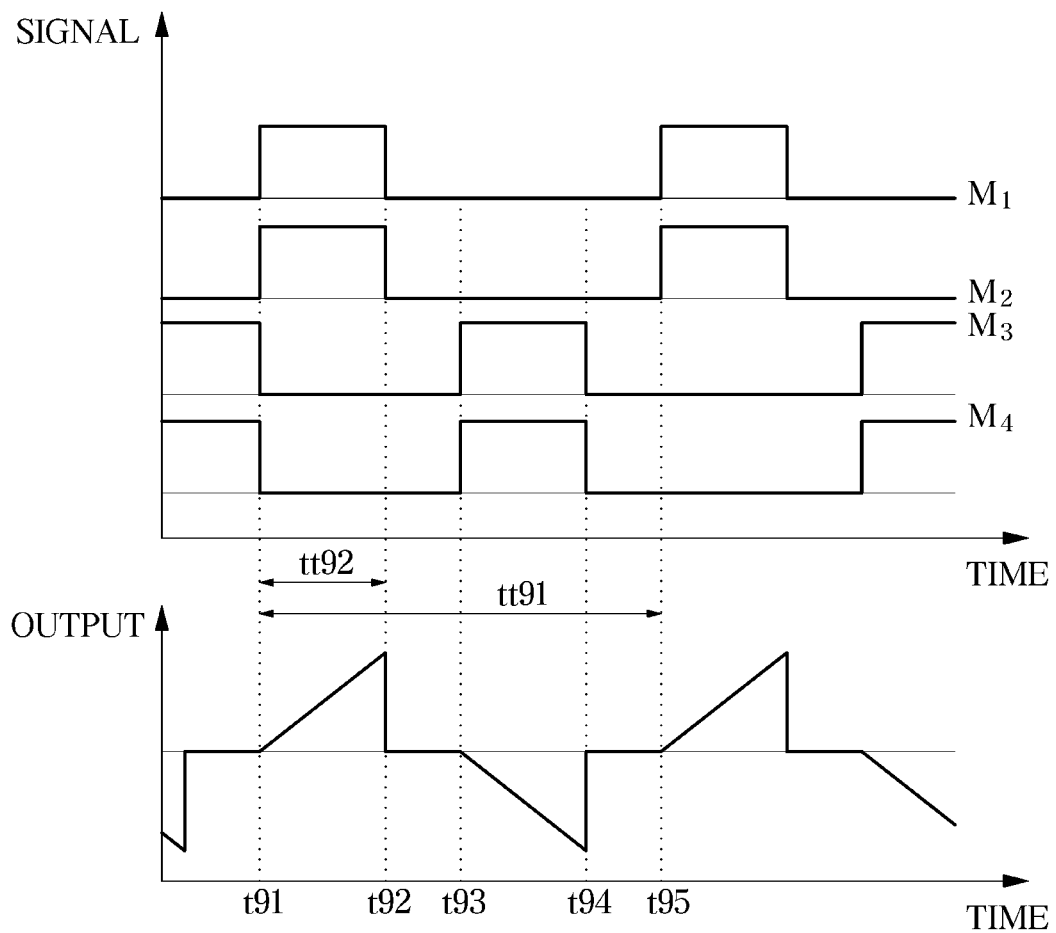

FIGS. 9A and 9B are diagrams for describing an operation of changing a modulation width according to an embodiment.

Referring to FIGS. 9A and 9B, the controller 140 performs a modulation control without opening or shorting one of the switching devices M1 to M4. The controller 140 may perform a modulation control of the input voltage by changing a modulation width while constantly maintaining a modulation frequency.

Specifically, referring to FIG. 9B, an operation period of the switching devices M1 to M4 controlled by the controller 140 may be determined as tt91. In the operation of changing the modulation width, the operation may be performed with a constantly fixed modulation frequency. The modulation width may be determined as a ratio of a period tt91 to an operation time tt92 of the switching devices M1 to M4. That is, the controller 140 may control the output voltage to follow the reference voltage by changing the ratio of the section where the switching devices M1 to M4 are in the On state in the total operation period tt91 of the switching devices M1 to M4.

Meanwhile, the modulation frequency may be determined as an inverse number of the operation period tt91 of the first to fourth switching devices M1 to M4.

Referring to FIG. 9B, an output current value between t91 and t92 may be derived in a section where the first and second switching devices M1 and M2 are in the On state and an output current value between t92 and t93 may be derived in a section where the third and fourth switching devices M3 and M4 are in the On state. Although a current flowing through the transformer is shown in FIG. 9B, a voltage is derived from the current, and thus a current waveform may be interpreted as a voltage waveform.

The controller 140 may control the output voltage to follow the reference voltage by comparing the magnitude of the output voltage derived by the above-described operation with that of the predetermined reference voltage.

For example, when the output voltage exceeds the reference voltage, the controller 140 may reduce the magnitude of the output voltage by decreasing the modulation width of the switching devices. By decreasing the modulation width, the magnitude of the modulated input voltage also decreases, and thus a voltage with a smaller magnitude may be output.

When the output voltage is below the reference voltage, the controller 140 may increase the magnitude of the output voltage by increasing the modulation width of the switching devices. By increasing the frequency of the switching devices, the magnitude of the modulated input voltage also increases, and thus a voltage with a greater magnitude may be output. According to an embodiment, the operation as shown in FIGS. 9A and 9B may be performed when the magnitude of the input voltage is in the range of 90 Vrms to 132 Vrms.

Figure 10A:
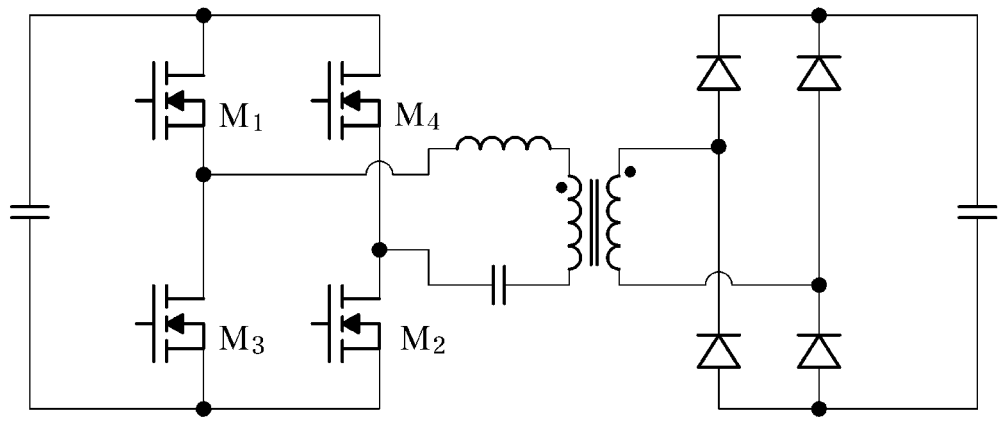
FIGS. 10A and 10B are diagrams for describing an operation of changing an operation phase of a switching device according to an embodiment.
Figure 10B:
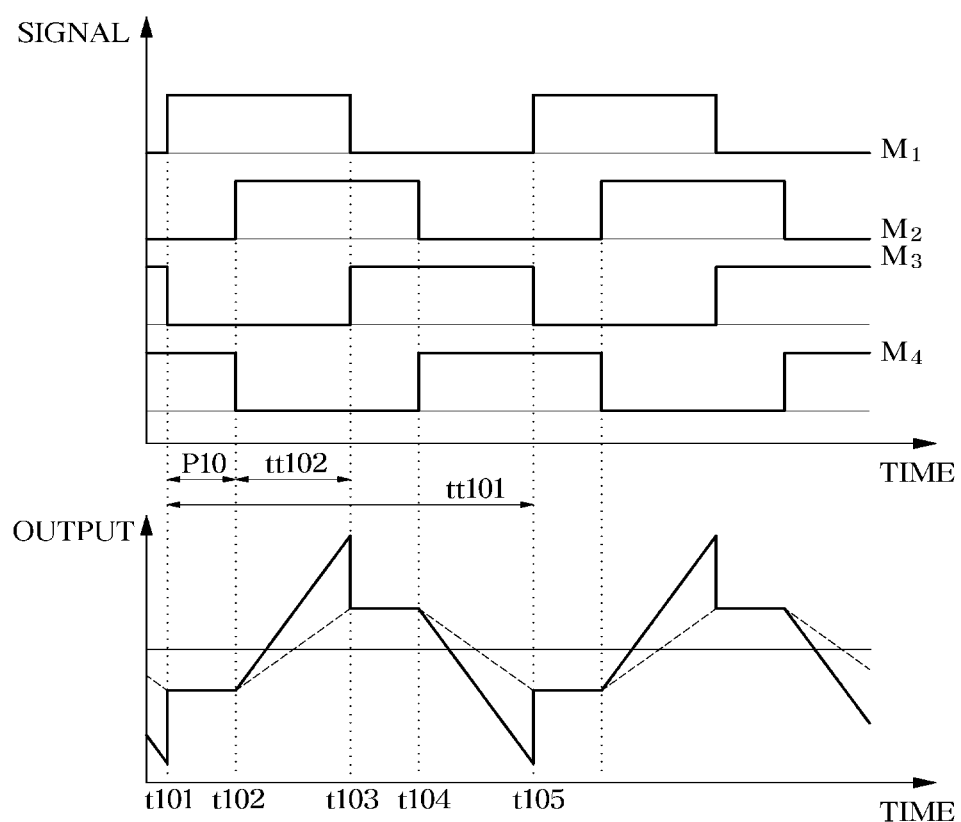

FIGS. 10A and 10B are diagrams for describing an operation of changing an operation phase of a switching device according to an embodiment.

Referring to FIGS. 10A and 10B, a phase-shifting operation to change a phase in the operations of the switching devices of FIGS. 7 to 9 is described.

Referring to FIGS. 10A and 10B, the controller 140 may not only output a voltage by controlling the modulation frequency and the modulation width of the switching devices as described above, but also output a voltage by setting a phase difference between the switching devices at a predetermined modulation frequency and a predetermined modulation width.

Referring to FIG. 10B, the first and second switching devices M1 and M2 may operate with a phase difference of 180 degrees (in-phase) and the second and fourth switching devices M2 and M4 may operate with a phase difference of 180 degrees (in-phase).

According to an embodiment, when both the first switching device M1 and the second switching device M2 and both the third switching device M3 and the fourth switching device M4 are simultaneously in the On state, a voltage and current may be output.

Meanwhile, in FIG. 10B, the first switching device M1 and the second switching device M2 may operate with a phase difference of P10. Based on the phase difference of P10, the transformer may output a voltage or current only between t101 and t102. Specifically, when the phase difference P10 increases, the modulation width t101-t102 effective for outputting decreases, resulting in a decrease in the output voltage. When the phase difference P10 output voltage decreases, the modulation width t101 to t102 effective for outputting increases, resulting in an increase in the output voltage.

The controller 140 may control the output voltage to follow the reference voltage by comparing the magnitude of the output voltage derived from the above-described operation with that of the predetermined reference voltage.

For example, when the output voltage exceeds the reference voltage, the controller 140 may reduce the magnitude of the output voltage by increasing the phase difference P10 between the switching devices. By increasing the phase difference P10, the magnitude of the modulated input voltage also decreases, and thus a voltage with a smaller magnitude may be output.

When the output voltage is below the reference voltage, the controller 140 may increase the magnitude of the output voltage by decreasing the phase difference P10 between the switching devices. By decreasing the phase difference P10, the magnitude of the modulated input voltage also increases, and thus a voltage with a greater magnitude may be output.

According to the operation described with reference to FIGS. 10A and 10B, a zero-voltage switching operation may be possible in the range of input voltage or the entire load range.

Meanwhile, in the operation described above with reference to FIGS. 7A to 10B, the operation of changing the output voltage by changing the modulation width may be referred to as pulse width modulation (PWM), and the operation of changing the output voltage by changing the modulation frequency may be referred to as pulse frequency modulation (PFM).

In addition, the drawings of FIGS. 7A to 10B and the descriptions corresponding thereto are merely examples for describing the operation of the present disclosure and the operation of controlling the output voltage to follow the reference voltage is not limited thereto.

Figure 11:
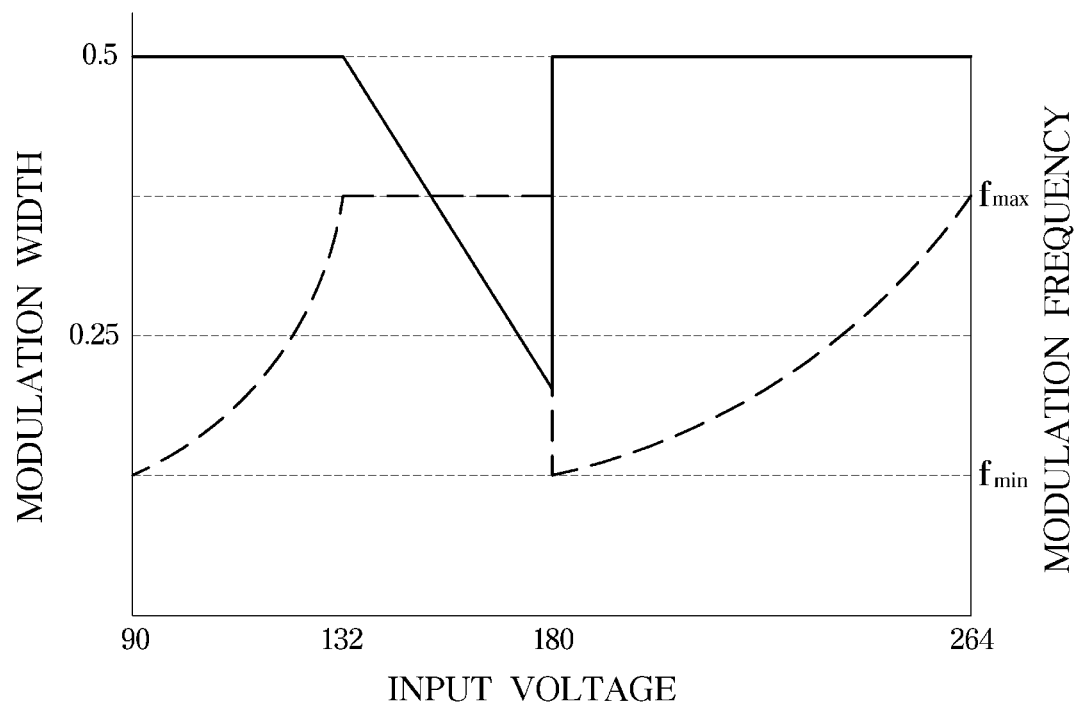
FIG. 11 is a diagram for describing an operation of a switching part according to an embodiment.

FIG. 11 is a diagram for describing an operation of a switching part according to an embodiment. Referring to FIG. 11, the operation of the switching device controlled by the controller is illustrated with regard to input voltage, modulation width, and modulation frequency.

Specifically, when the input voltage has a magnitude of 90 Vrms to 132 Vrms, the controller may control the output voltage to follow the reference voltage by changing the modulation frequency while fixing the modulation width of the switching devices.

When the input voltage has a magnitude of 132 Vrms to 180 Vrms, the controller may control the output voltage to follow the reference voltage by changing the modulation width while fixing the modulation frequency of the switching devices. The operation of changing the modulation width of the switching devices may linearly change the output voltage.

Specifically, the input voltage has a magnitude of 132 Vrms to 264 Vrms, the controller may control the output voltage to follow the reference voltage by changing the modulation frequency while fixing the modulation width of the switching devices.

Meanwhile, in the above-described operation, the controller may control the output voltage to follow the reference voltage by changing an operation phase of at least one of the plurality of switching devices.

Meanwhile, an operation waveform of the switching device described in FIG. 11 is merely an example of according to the present disclosure, and the operation is not particularly limited as long as the operation is an operation of the switching device to control the output voltage to follow the reference voltage.

Figure 12:
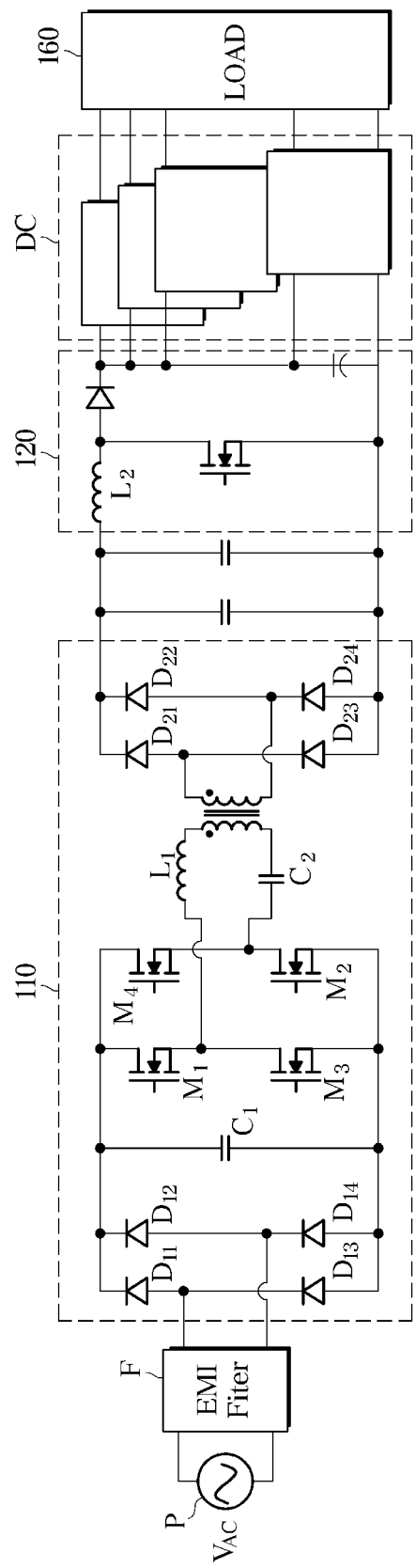
FIG. 12 is a diagram illustrating a transformer and a power-factor improver connected to a load 160 according to an embodiment.
Figure 13:
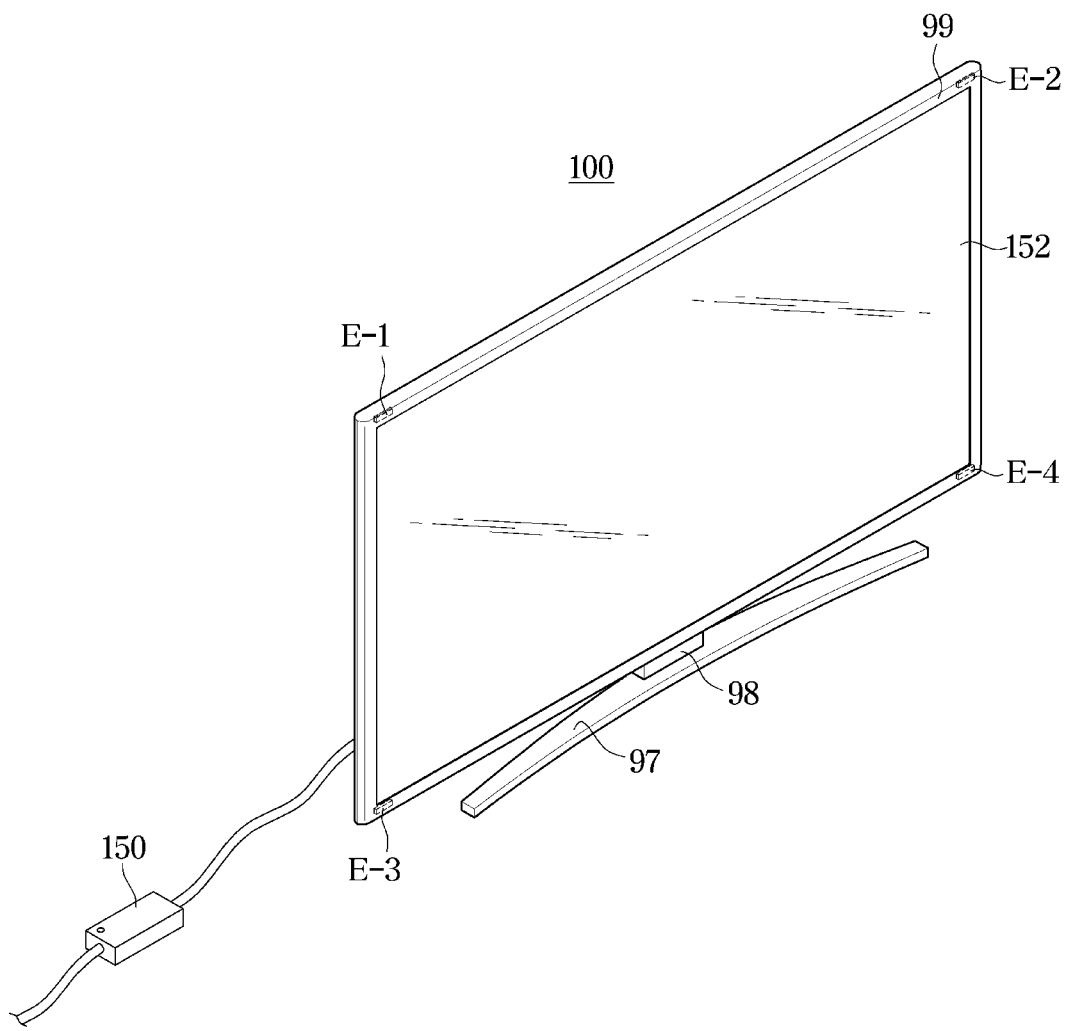
FIG. 13 is a diagram illustrating an external appearance of a display device according to another embodiment of the present disclosure.

FIG. 12 is a diagram illustrating a transformer 110 and a power-factor improver 120 connected to a load 160 according to an embodiment. FIG. 13 is a diagram illustrating an external appearance of the display device 100 according to another embodiment of the present disclosure.

Referring to FIGS. 12 and 13, the above-described transformer 110 may be connected to the power-factor improver 120, and an output terminal of the power-factor improver 120 may be connected to the load 160 via a direct current (DC) converter. According to an embodiment, the display 130 may be included in the load 160. The transformer 110 of the present disclosure may be included in an adaptor 150.

Specifically, the adaptor 15 of the present disclosure may become smaller in size since an electrolytic capacitor, which has been used in conventional adaptors, is not required.

Meanwhile, a compact adaptor 150 according to an embodiment of the present disclosure is shown in FIGS. 12 and 13, and the embodiment of the present disclosure is not limited thereto.

FIGS. 14 to 17 are flowcharts according to an embodiment.

Figure 14:
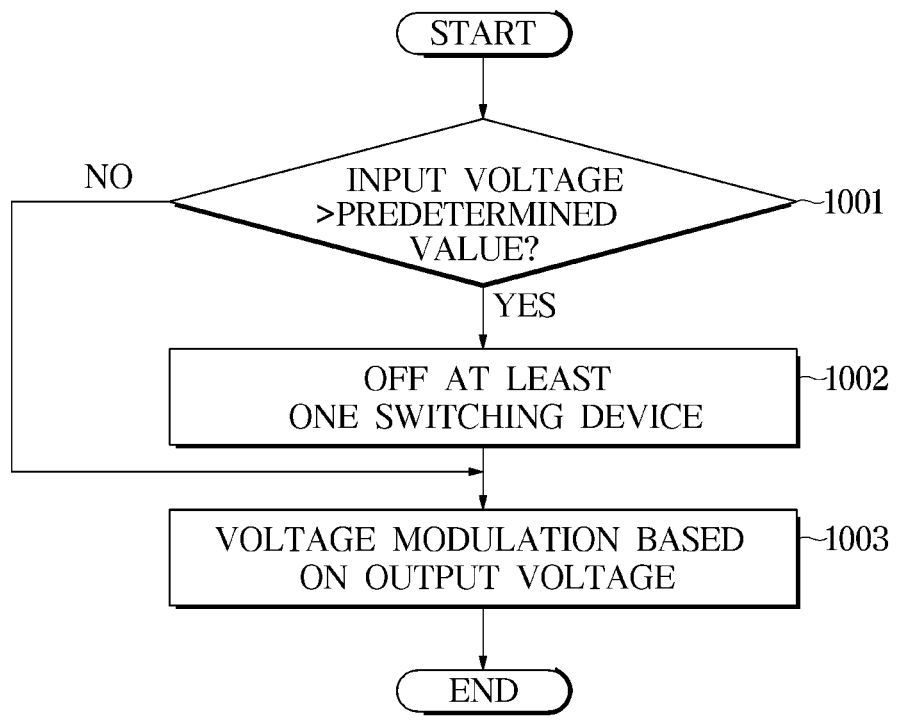
FIGS. 14, 15, 16 and 17 are flowcharts according to an embodiment.

Referring to FIG. 14, the transformer may receive a voltage from a power supply and the controller may determine whether an input voltage exceeds a predetermined value (1001).

When the input voltage exceeds the predetermined value, the controller may set at least one switching device in an Always-Off state, divide the voltage, and transmit the voltage to the load (1002). The controller may perform a modulation control to control the output voltage to follow the reference voltage based on the output voltage (1003).

Figure 15:
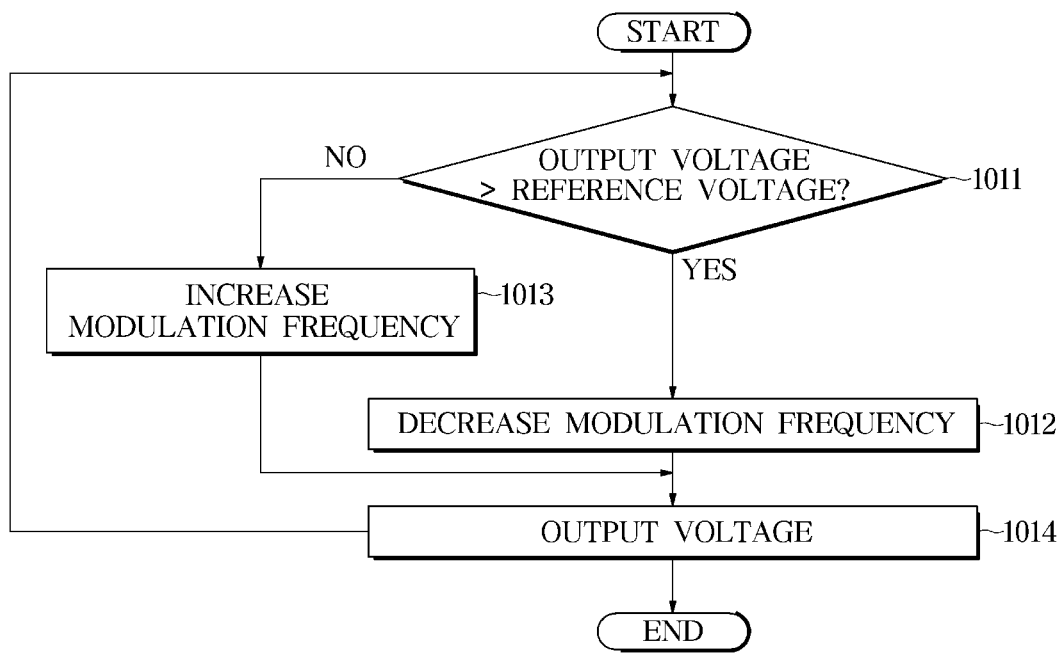
Figure 16:
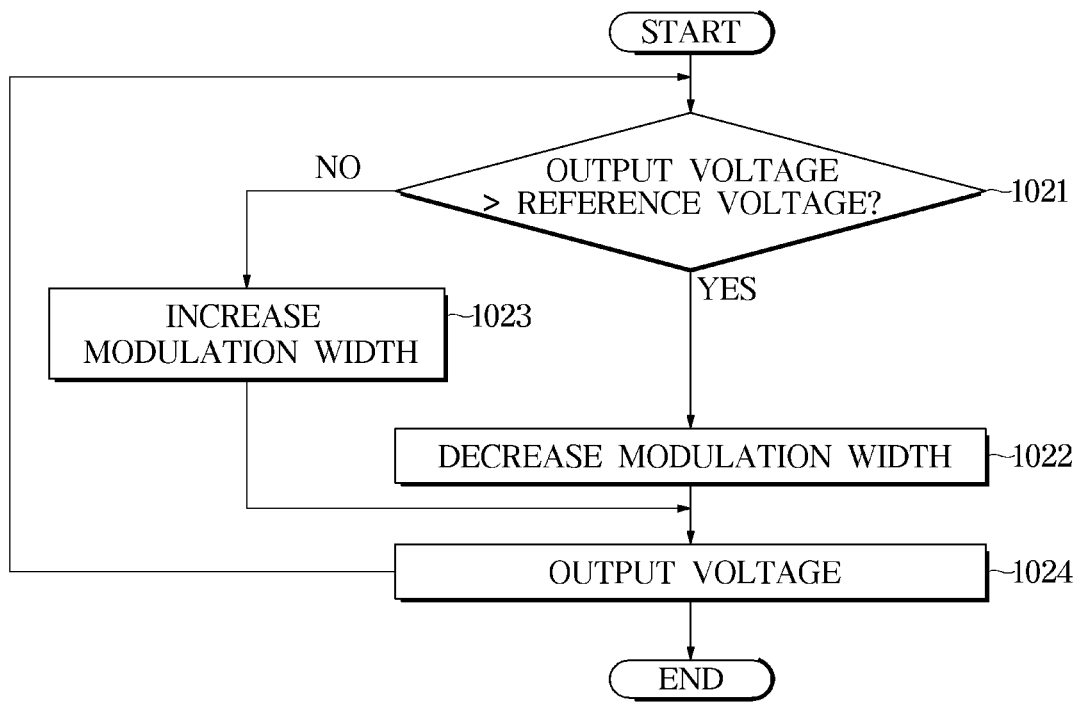
Figure 17:
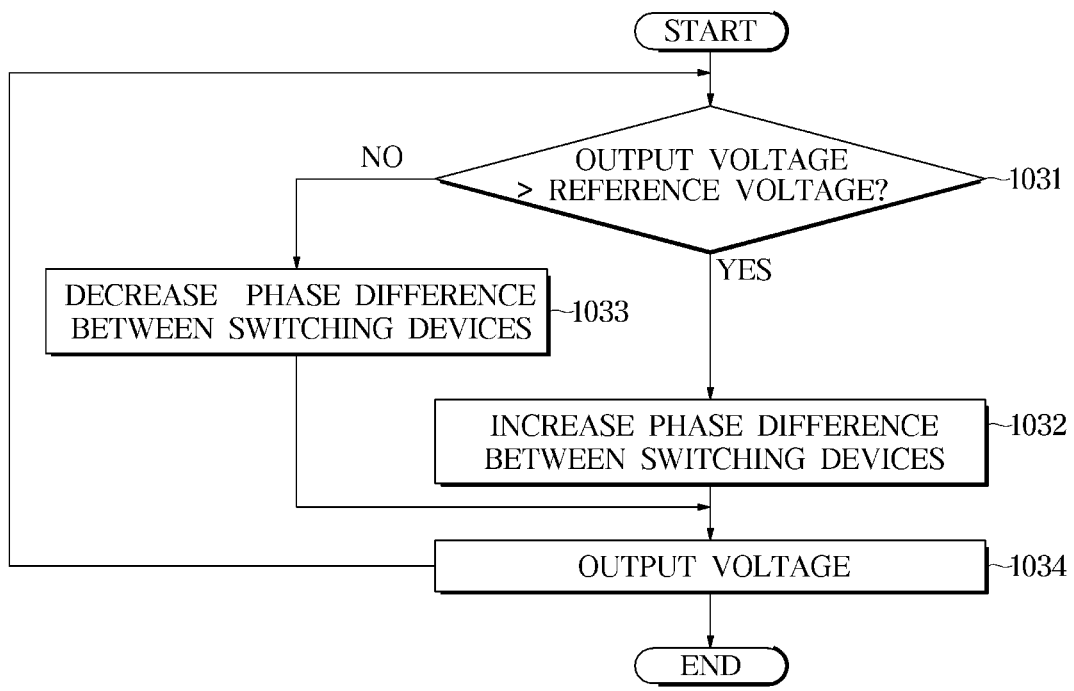

FIGS. 15 to 17 are flowcharts for implementing a modulation control.

Referring to FIG. 15, the controller may determine whether the output voltage exceeds the reference voltage (1011). When the output voltage exceeds the reference voltage, the controller may reduce the modulation frequency to decrease the output voltage (1012). Meanwhile, when the output voltage does not exceed the reference voltage, the controller may control the output voltage to follow the reference voltage by increasing the modulation frequency (1013). Based thereon, the controller may control the transformer to output the voltage (1014).

Referring to FIG. 16, the controller may determine whether the output voltage exceeds the reference voltage (1021). When the output voltage exceeds the reference voltage, the controller may reduce the modulation width to decrease the output voltage (1022). Meanwhile, when the output voltage does not exceed the reference voltage, the controller may control the output voltage to follow the reference voltage by increasing the modulation width (1023). Based thereon, the controller may control the transformer to output the voltage (1024).

Referring to FIG. 17, the controller may determine whether the output voltage exceeds the reference voltage (1031). When the output voltage exceeds the reference voltage, the controller may increase a phase difference between switching devices to decrease the output voltage (1032). Meanwhile, when the output voltage does not exceed the reference voltage, the controller may control the output voltage to follow the reference voltage by decreasing the phase difference between the switching devices (1033). Based thereon, the controller may control the transformer to output the voltage (1034).

Meanwhile, the aforementioned embodiments may be embodied in the form of a recording medium storing instructions executable by a computer. The instructions may be stored in the form of program codes and perform the operation of the disclosed embodiments by creating a program module when executed by a processor. The recording medium may be embodied as a computer readable recording medium.

The computer readable recording medium includes all types of recording media that store instructions readable by a computer such as read only memory (ROM), random access memory (RAM), magnetic tape, magnetic disc, flash memory, and optical data storage device.

While the present disclosure has been particularly described with reference to exemplary embodiments, it should be understood by those of skilled in the art that various changes in form and details may be made without departing from the spirit and scope of the present disclosure.

What is claimed is:

1. A display device comprising:
a display;
a transformer configured to transform a commercial power and supply the transformed commercial power to the display and comprising a plurality of switching devices; and
a controller configured to:
control on or off of the plurality of switching devices based on a magnitude of an input voltage input to the transformer;
control at least one switching device to always turn off so that the transformer operates as a half bridge LLC converter in response to the magnitude of the input voltage exceeding a predetermined value;
determine a method for a modulation control of an output voltage of the transformer as one of changing modulation width of the plurality of switching devices or changing modulation frequency of the plurality of switching devices based on the magnitude of the input voltage; and
based on the determined method for the modulation control, perform the modulation control of the output voltage of the transformer so that the output voltage of the transformer follows a predetermined reference voltage.

2. The display device of claim 1, wherein the controller is configured to control the output voltage to follow the reference voltage by changing an operation phase of at least one of the plurality of switching devices based on the output voltage.

3. The display device of claim 1, further comprising a low pass filter connected to an output terminal of the transformer, wherein the controller is configured to determine an average voltage of the low pass filter as the output voltage.

4. The display device of claim 1, further comprising a peak detector connected to an output terminal of the transformer, wherein the controller is configured to determine a peak value of the peak detector as the output voltage.

5. The display device of claim 1, wherein the plurality of switching devices is classified into:
a first switching part comprising at least one of the plurality of switching devices; and
a second switching part comprising a plurality of switching devices not belonging to the first switching part,
wherein the controller is configured to control the output voltage to follow the reference voltage by alternately turning on the first switching part and the second switching part.

6. The display device of claim 1, further comprising a power-factor circuit configured to increase an effective power of a power supply connected to the display device, wherein the transformer is configured to allow the power supply to supply a current to a predetermined region.

7. The display device of claim 1, wherein the controller is configured to control the plurality of switching devices to control the output voltage to follow the reference voltage based on a difference between the output voltage and the predetermined reference voltage.

8. A method of controlling a display device, the method comprising:
- controlling on or off of a plurality of switching devices based on a magnitude of an input voltage input to a transformer;
- controlling at least one switching device to always turn off so that the transformer operates as a half bridge LLC converter in response to the magnitude of the input voltage exceeding a predetermined value;
- determining a method for a modulation control of an output voltage of the transformer as one of changing modulation width of the plurality of switching devices or changing modulation frequency of the plurality of switching devices based on the magnitude of the input voltage; and
- based on the determined method for the modulation control, performing the modulation control of an output voltage of the transformer so that the output voltage of the transformer follows a predetermined reference voltage.

* * * * *